United States Patent
Aoki (10) Patent No.: US 8,169,651 B2
(45) Date of Patent: May 1, 2012

(54) DATA PROCESSING APPARATUS FOR RECOGNIZING AND PROCESSING CONTENT RECORDED ON A RECORDING MEDIUM

(75) Inventor: Kazuma Aoki, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 991 days.

(21) Appl. No.: 10/740,851

(22) Filed: Dec. 22, 2003

(65) Prior Publication Data

US 2004/0130749 A1   Jul. 8, 2004

(30) Foreign Application Priority Data

Dec. 27, 2002   (JP) .................................. 2002-380928

(51) Int. Cl.
*G06K 15/00* (2006.01)

(52) U.S. Cl. ...................... 358/1.18; 358/1.11; 358/1.15; 358/1.16; 358/221; 358/225; 358/226

(58) Field of Classification Search .................. 358/1.15, 358/1.18, 401, 452, 527, 537; 382/309, 176, 382/177, 179, 181–231, 312, 321; 709/201, 709/203, 212, 218, 219, 238; 715/234, 221–226
See application file for complete search history.

(56) References Cited

U.S. PATENT DOCUMENTS

| 4,566,127 | A | * | 1/1986 | Sekiya et al. ................. 382/175 |
| 4,893,333 | A | * | 1/1990 | Baran et al. .............. 379/100.11 |
| 5,083,218 | A | * | 1/1992 | Takasu et al. ................. 358/473 |
| 5,093,873 | A | * | 3/1992 | Takahashi ...................... 382/306 |
| 5,123,062 | A | * | 6/1992 | Sangu ............................ 382/174 |
| 5,671,067 | A | * | 9/1997 | Negishi et al. ................ 358/403 |
| 5,893,127 | A | * | 4/1999 | Tyan et al. ..................... 715/209 |
| 5,991,469 | A | * | 11/1999 | Johnson et al. ............... 382/317 |
| 5,992,752 | A | * | 11/1999 | Wilz et al. ................. 235/472.01 |
| 6,076,733 | A | * | 6/2000 | Wilz et al. ................. 235/462.01 |
| 6,141,111 | A | * | 10/2000 | Kato ............................. 358/1.15 |
| 6,181,326 | B1 | * | 1/2001 | Takahashi ..................... 345/158 |
| 6,202,060 | B1 | * | 3/2001 | Tran ................................ 707/3 |
| 6,327,045 | B1 | * | 12/2001 | Teng et al. .................... 358/1.15 |
| 6,366,947 | B1 | * | 4/2002 | Kavner ......................... 709/203 |
| 6,369,811 | B1 | * | 4/2002 | Graham et al. ............... 715/764 |
| 6,370,259 | B1 | * | 4/2002 | Hobson et al. ............... 382/101 |
| 6,401,067 | B2 | * | 6/2002 | Lewis et al. .................. 704/275 |
| 6,421,693 | B1 | * | 7/2002 | Nishiyama et al. .......... 715/226 |

(Continued)

FOREIGN PATENT DOCUMENTS

JP   A 01-191986   8/1989

(Continued)

*Primary Examiner* — King Poon
*Assistant Examiner* — Richard Zhu
(74) *Attorney, Agent, or Firm* — Oliff & Berridge, PLC (57) ABSTRACT

A data processing apparatus scans a web page image printed on paper, recognizes the character array for a URL included in the image, acquires data for the web page in the image through the Internet, identifies the positions of entry spaces in the web page, recognizes the content entered by hand on the paper, and stores this content in RAM. The data processing apparatus prompts the user to select whether to perform a verification print for verifying the recognized content and prints the recognized content when the user indicates such a desire. Further, the data processing apparatus prompts the user to select whether to transmit the content to the server and transmits the content stored in RAM when the user indicates such a desire.

18 Claims, 7 Drawing Sheets

U.S. PATENT DOCUMENTS

| | | | |
|---|---|---|---|
| 6,526,184 B2 * | 2/2003 | Fendt | 382/309 |
| 6,727,996 B1 * | 4/2004 | Silverbrook et al. | 358/1.1 |
| 6,744,529 B2 * | 6/2004 | Winter et al. | 358/1.15 |
| 6,816,274 B1 * | 11/2004 | Silverbrook et al. | 358/1.15 |
| 6,886,136 B1 * | 4/2005 | Zlotnick et al. | 715/780 |
| 6,898,317 B2 * | 5/2005 | Struble et al. | 382/209 |
| 7,072,059 B2 * | 7/2006 | Van Der Linden et al. | 358/1.15 |
| 7,142,318 B2 * | 11/2006 | Lopez et al. | 358/1.15 |
| 7,142,728 B2 * | 11/2006 | Wnek | 382/294 |
| 7,289,685 B1 * | 10/2007 | Wolff et al. | 382/317 |
| 8,037,310 B2 * | 10/2011 | Wolff | 713/176 |
| 2001/0053978 A1 * | 12/2001 | Lewis et al. | 704/275 |
| 2002/0167687 A1 * | 11/2002 | Tsai | 358/402 |
| 2003/0133156 A1 * | 7/2003 | Cragun et al. | 358/1.18 |
| 2003/0233619 A1 * | 12/2003 | Fast | 715/517 |

FOREIGN PATENT DOCUMENTS

| | | |
|---|---|---|
| JP | A 06-164781 | 6/1994 |
| JP | A 7-107256 | 4/1995 |
| JP | A 08-097960 | 4/1996 |
| JP | A 10-065853 | 3/1998 |
| JP | A 11-316672 | 11/1999 |

* cited by examiner

```
<HTML>
<H1>Registration</H1>
<P>
Please,register your data to join us.<BR>
<BR>
<FORM ACTION="url" METHOD="GET" URL="http://xxx.com/cgi/prog_a">
Name : <INPUT TYPE="text" NAME="Name" SIZE="20"><BR>
Male : <INPUT TYPE="radio" NAME="Sex" VALUE="Male">
Female : <INPUT TYPE="radio" NAME="Sex" VALUE="Female"><BR>
Address : <INPUT TYPE="text" NAME="Address" SIZE="40"><BR>
<BR>
<INPUT TYPE="submit" VALUE="send">
</FORM>
</P>
</HTML>
```

VERIFICATION PRINT

THE FOLLOWING DATA WILL BE TRANSMITTED TO THE SERVER AT http://xxx.com/cgi/prog_a.

| Name | Kazuma AOKI |
|---|---|
| Sex | Male |
| Address | 123 XXX YYY ZZZ Japan |

PRESS THE START BUTTON TO TRANSMIT OR THE CANCEL BUTTON TO START OVER.

DATA PROCESSING APPARATUS FOR RECOGNIZING AND PROCESSING CONTENT RECORDED ON A RECORDING MEDIUM

BACKGROUND OF THE INVENTION

1. Field of the Invention

The present invention relates to a data processing apparatus for recognizing and processing content recorded on a recording medium.

2. Description of Related Art

Among devices having functions for scanning images recorded on a recording medium, there are devices well-known in the art that are capable of recognizing handwritten content on a recording medium and processing the handwritten content.

For example, Japanese patent application publication No. HEI-7-107256 discloses an apparatus for scanning an image on a command sheet that includes checks or handwritten characters and, based on the results of recognizing this handwritten content, generating (printing) a command sheet with filled in checkboxes or characters in a type font (in other words, producing a clean copy of the command sheet). After the new command sheet is generated by the apparatus, the user inserts the command sheet in the apparatus to be scanned. The apparatus recognizes the content on the command sheet and performs a process based on the content. By using the clean copy of the command sheet, the recognition accuracy of the apparatus is improved.

SUMMARY OF THE INVENTION

However, this apparatus requires that the user not only perform an operation on the apparatus to scan a command sheet including handwritten checks or text, but also requires that the user perform another operation with the apparatus to scan the clean copy of the command sheet generated based on the first command sheet. In other words, the user must scan command sheets on the apparatus twice, thereby requiring extra time and effort.

In view of the foregoing, it is an object of the present invention to provide a data processing apparatus capable of recognizing content on a recording medium and processing the recognized content without requiring the user to insert a clean copy of the content and preventing, is through a simple operation, such processing from being performed when the content has not been recognized properly.

In order to attain the above and other objects, the present invention provides a data processing apparatus. The data processing apparatus includes a scanning unit, an identification-data acquiring unit, an entry-space-position identifying unit, a manual-entry content recognizing unit, a storing unit, an operating unit, a manual-entry content printing unit, a first selecting unit, and a processing unit.

The scanning unit scans an image on a recording medium. The image includes printed content that has an entry space at a position and is printed on the recording medium, and manual-entry content that is entered manually in the entry space. The scanning unit produces output data indicative of the printed content and the manual-entry content.

The identification-data acquiring unit acquires identification data that corresponds to the printed content in the image. For example, the identification data may be located at a location that is connected to the data processing apparatus via a network. In another example, the identification data may be located at another location inside the data processing apparatus.

The entry-space-position identifying unit identifies the position of the entry space based on both the identification data acquired by the identification-data acquiring unit and the output data. The manual-entry content recognizing unit recognizes the manual-entry content based on the position of the entry space identified by the entry-space-position identifying unit.

The storing unit stores the manual-entry content recognized by the manual-entry content recognizing unit. The operating unit enables a user to perform an input operation. The manual-entry content printing unit prints the manual-entry content stored in the storing unit on another recording medium.

The first selecting unit enables the user to make a selection through the operating unit whether to perform a predetermined process. The first selecting unit produces a first signal instructing to perform the predetermined process when the user has performed a first input operation instructing to perform the predetermined process, and produces a second signal instructing not to perform the predetermined process when the user has performed a second input operation instructing not to perform the predetermined process.

The processing unit performs the predetermined process using the manual-entry content stored in the storing unit when the first selecting unit has produced the first signal, and prohibits the predetermined process when the first selecting unit has produced the second signal. For example, the predetermined process may be a process to transmit the manual-entry content to a location that is connected to the data processing apparatus. In another example, the predetermined process may be a process to change predetermined information stored in the data processing apparatus to updated information.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENTS

A data processing apparatus according to preferred embodiments of the present invention will be described while referring to the accompanying drawings wherein like parts and components are designated by the same reference numerals to avoid duplicating description.

Figure 1:
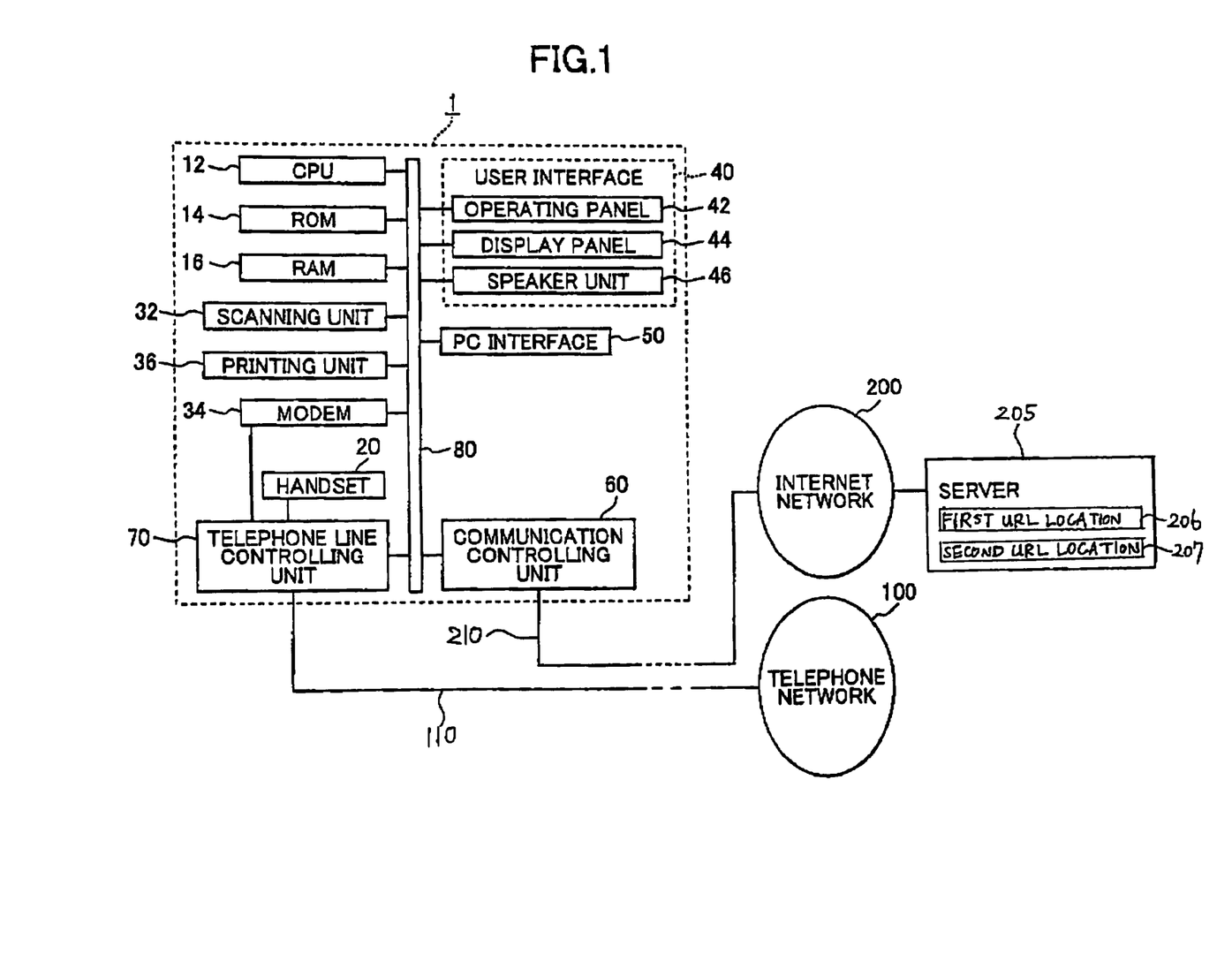
FIG. 1 is a block diagram showing a multifunction device according to an embodiment of the present invention.

A data processing apparatus according to an embodiment of the present invention will be described with reference to the drawings. FIG. 1 is a block diagram showing the construction of a multifunction device 1 according to the embodiment.

The multifunction device 1 includes a telephone function for implementing a voice conversation via a telephone network 100, a facsimile function for transmitting and receiving images via the telephone network 100, and an internet function for performing data communications via an internet network 200. As shown in FIG. 1, the multifunction device 1 includes a CPU 12, a ROM 14, a RAM 16, a scanning unit 32, a modem 34, a printing unit 36, a user interface 40, a PC interface 50, a communication controlling unit 60, and a telephone line controlling unit 70 that are connected to one another via a bus 80. A handset 20 is also connected to the telephone line controlling unit 70. The telephone line controlling unit 70 is connected to the telephone network 100 via a telephone line 110. The communication controlling unit 60 is connected to the internet network 200 via a communication line 210. A server 205 is connected to the internet network 200. A first URL location 206 and a second URL location 207 are located at the server 205, and indicate locations of a first URL (Uniform Resource Locator) and a second URL, respectively, to be described later.

The CPU 12 controls overall operations of the multifunction device 1 by transmitting commands to each component in the multifunction device 1 via the bus 80 according to processing steps stored in the ROM 14, while storing results of processes in the RAM 16. In addition to the aforementioned processing steps, the ROM 14 stores communication software that implements functions for requesting the transmission of web page data via the communication controlling unit 60 from the server 205 connected to the internet network 200 and receiving the web page data transmitted from the server 205 in response to this request via the communication controlling unit 60.

The handset 20 is activated by lifting the handset 20 from a main body (not shown) of the multifunction device 1.

Upon receiving commands from the CPU 12, the scanning unit 32 scans an image from a recording medium, such as paper, set in a reading unit (not shown) and generates image data for the scanned image.

Upon receiving commands from the CPU 12, the modem 34 generates image signals that can be transmitted via the telephone network 100 by modulating the image data generated by the scanning unit 32. The modem 34 also generates image data by demodulating image signals inputted from the telephone network 100 via the telephone line 110 and the telephone line controlling unit 70.

The printing unit 36 receives commands from the CPU 12 to print an image on paper set in a paper supply unit (not shown).

The user interface 40 includes an operating panel 42 having a plurality of operating buttons, a display panel (LCD) 44 for displaying various data, and a speaker unit 46 having a speaker and a circuit for driving the speaker. The operating panel 42 includes a plurality of character buttons for inputting alphanumeric characters and symbols, a Start button for initiating various processes, a Cancel button for performing a cancel operation, and a Mode Switch button for changing an operating mode. The Mode Switch button can change the operating mode of the multifunction device 1 between a normal mode for performing normal operations and a web printing mode for performing a web printing process and an entry-content transmitting process described later.

The PC interface 50 is an interface capable of connecting the multifunction device 1 to another computer system via a communication cable (not shown) to enable data communications between the multifunction device 1 and the other computer system.

The communication controlling unit 60 receives commands from the CPU 12 for inputting data in packet units from the server 205 via the internet network 200 and the communication line 210, and for outputting data in packet units to the server 205 via the communication line 210 and the internet network 200.

The telephone line controlling unit 70 inputs voice and image signals from the telephone network 100 and outputs such signals to the telephone network 100. Upon receiving commands from the CPU 12, the telephone line controlling unit 70 sets a transfer path including a transfer destination and a transfer source for signals to be inputted and outputted between the telephone network 100. Specifically, when performing an off-hook operation in which the handset 20 is removed from the main body of the multifunction device 1, the path from the telephone line controlling unit 70 to the handset 20 is set as the aforementioned transfer path, enabling voice signals to be transferred along the transfer path. The transfer path is cancelled when an on-hook operation is performed to return the handset 20 to the main body of the multifunction device 1, returning the multifunction device 1 to a state in which voice signals cannot be transferred on the path. When an operation for transmitting an image, for example, a fax transmission is performed on the operating panel 42 or when image signals are received, the transmission path is set from the telephone line controlling unit 70 to the modem 34, enabling image signals to be transmitted along the transmission path. The transmission path is cancelled when the modem 34 ends output of image signals or when the input of image signals from the telephone network 100 ends, returning the multifunction device 1 to a state in which image signals are not transmitted on the path.

Although it is not shown in FIG. 1, the telephone line 110 and the communication line 210 commonly use the same line in a section between the multifunction device 1 and a telephone exchange (not shown). In this section, signals transmitted via the telephone line 110 are superimposed on packet data transmitted via the communication line 210 using ADSL (Asymmetric Digital Subscriber Line) technology.

Figure 2:
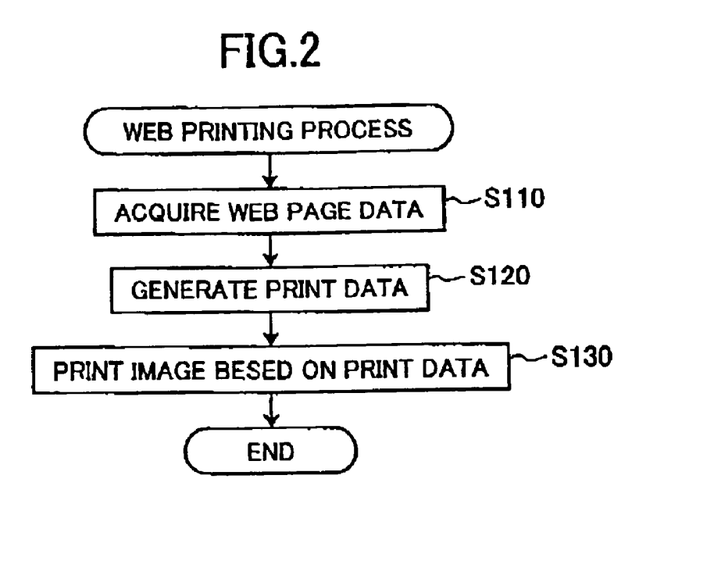
FIG. 2 is a flowchart showing steps in a web printing process.

Next, the web printing process will be described with reference to a flowchart in FIG. 2. The CPU 12 displays, on the display panel 44, a message prompting the user to input a URL (Uniform Resource Locator) for a desired web page (first URL), on condition that the operating mode of the multifunction device 1 is set to the web printing mode and that paper is not loaded in the reading unit. The web printing process is initiated when the user inputs the first URL for the desired web page using the character buttons in the operating panel 42 and subsequently presses the Start button on the operating panel 42.

At the beginning of the web printing process in step S110 in FIG. 2 (step is hereinafter referred to as "S"), the CPU 12 uses the first URL to acquire, via the internet network 200, the web page data describing the web page corresponding to the first URL. Specifically, the CPU 12 directs the communication controlling unit 60 to transmit request data requesting the web page data corresponding to the first URL and to receive the web page data transmitted from the first URL location 206 at the server 205 in response to the request. The web page data acquired in this way is normally HTML (Hyper Text Markup Language) data. An example of HTML data is shown in FIG. 3 and is described in more detail later.

Figure 3:
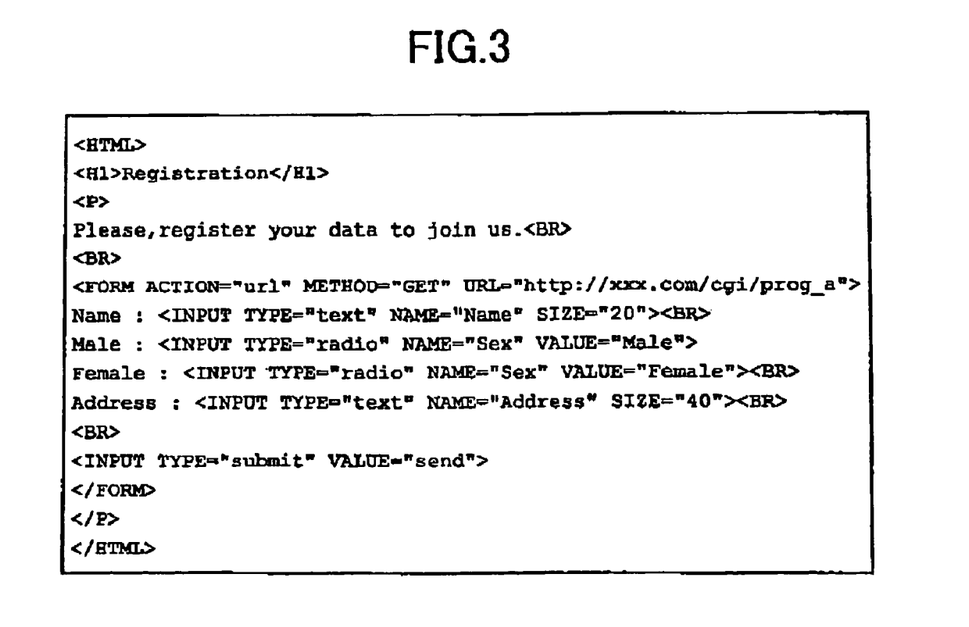
FIG. 3 is an explanatory diagram showing an example of web page data (HTML data)
Figure 4:
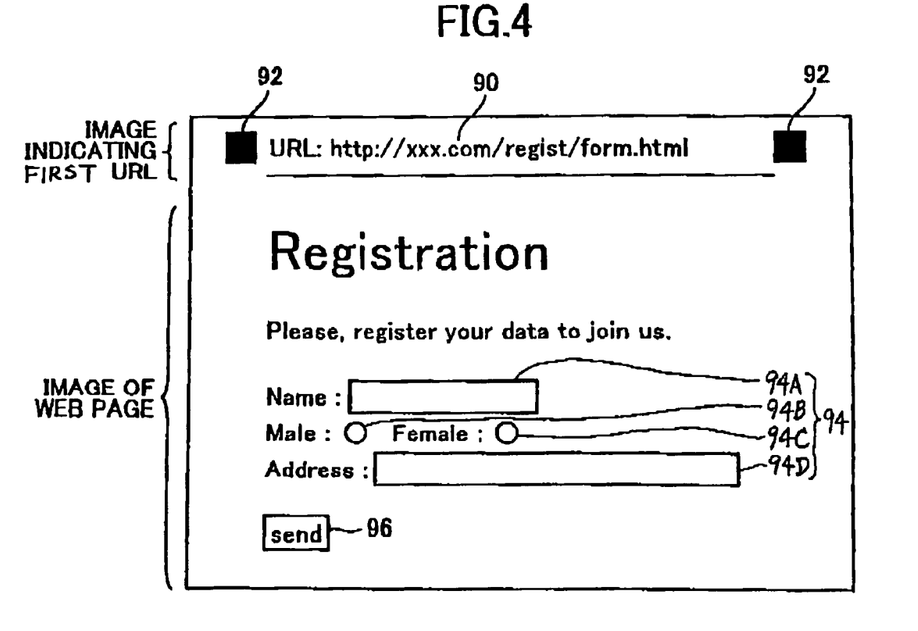
FIG. 4 is an explanatory diagram showing an image of a web page with entry spaces.

FIG. 4 shows an image of the web page described by the HTML data of FIG. 3. In S120, the CPU 12 generates print data (image data) for printing an image based on the web page data acquired in S110. Specifically, the CPU 12 generates print data for a composite image including an image of the web page corresponding to the web page data and an image showing the first URL of the web page, as in the example of FIG. 4. Here, the image showing the first URL is disposed at a predetermined position, or region, in the top of the image. The image showing the first URL includes a character array 90 that indicates the first URL, and symbols 92 (filled-in squares, in this example) disposed on the left and right ends of the character array 90 to serve as markers used in a process described later (S210 in the entry-content transmitting process in FIG. 6) for recognizing the character array 90.

In S130, the CPU 12 directs the printing unit 36 to print an image corresponding to the print data generated in S120 on paper, and the web printing process ends.

With the web printing process, the multifunction device 1 implements a web printing function for printing an image of a web page on paper based on web page data that can be acquired via the internet network 200. Hence, the user can print out a desired web page on paper for viewing.

In addition to a type of web pages simply for viewing information, there is another type of web pages that have entry spaces 94, as shown in FIG. 4, in which the user can input or enter data. The latter type of web pages, which will be referred to as data-input web pages, are used for web site member registration and the like.

When viewing the data-input web page using a web browser on a personal computer, the user can directly input data in the entry spaces 94 of the web page displayed on the display of the personal computer using the keyboard and mouse. Further, by clicking on a. Send button 96 in the web page, the user can transmit data inputted into the entry spaces 94 to the server 205.

Figure 5:
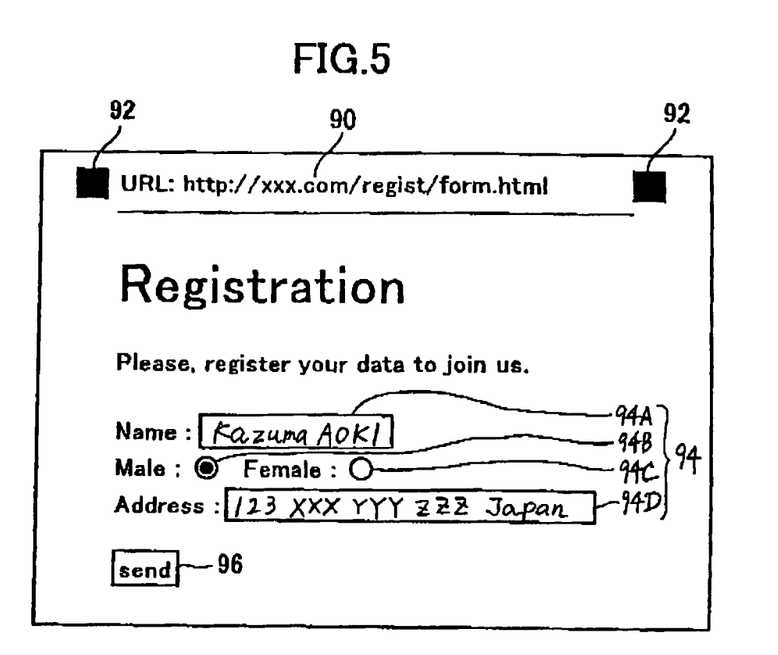
FIG. 5 is an explanatory diagram showing an image of a web page including handwritten entry content in the entry spaces.

On the contrary, the multifunction device 1 of the present embodiment enables the user to enter data for a data-input web page without using a display. As shown in FIG. 5, the data-input web page is printed out on paper, enabling the user to fill in the entry spaces 94 of the web page by hand. By scanning the image from the paper, the multifunction device 1 recognizes entry content entered manually in the entry spaces 94 of the image and transmits the recognized entry content to a transmission location (second URL location 207) at the server 205.

Next, an entry-content transmitting process will be described with reference to the flowchart in FIG. 6. The CPU 12 displays, on the display panel 44, a message prompting the user to press the Start button in the operating panel 42, on condition that the operating mode of the multifunction device 1 is set to the web printing mode and that paper is loaded in the reading unit (not shown). The CPU 12 initiates the entry-content transmitting process when the user presses the Start button in the operating panel 42 under these conditions.

At the beginning of the entry-content transmitting process in S205, the CPU 12 controls the scanning unit 32 to scan the image of the data-input web page on the paper set in the reading unit, and to produce output data indicative of the scanned image.

In S210, the CPU 12 uses the output data and recognizes the character array 90 for the first URL located at the specific position in the scanned image (FIG. 5) according to an OCR (Optical Character Recognition) process. The specific position is the region between the symbols 92, and thus can be accurately identified by the symbols 92. Because the CPU 12 controls the scanning unit 32 to scan the image and obtain the first URL, it is unnecessary for the user to input the first URL manually.

In S220, the CPU 12 acquires, via the internet network 200, web page data describing the web page corresponding to the first URL, using the first URL recognized in S210.

In S230, the CPU 12 analyzes the web page data (HTML data) acquired in S220 and identifies positions, variable names, and values of entry spaces included in the web page, as well as the command (method) and address (URL) for a CGI (Common Gateway Interface) program. The command (method) of the CGI program specifies the method for transferring input data to the CGI program (GET or POST).

A brief description of HTML data will be given here. As shown in FIG. 3, the HTML data representing the data-input web page includes form tags. (<FORM . . . > . . . </FORM). Input elements (<INPUT . . . >) described between the FORM tags indicate the entry spaces in the web page image. The input elements (<INPUT . . . >) include data for specifying a type of the entry space (entry-space-type specifying data) such as TYPE="text" and TYPE="radio". According to the type attribute of the input element, the entry spaces can be spaces for text input, such as a text type (TYPE="text") or a password type (TYPE="password"), or spaces for checking, such as a radio type (TYPE="radio") or a checkbox type (TYPE="checkbox").

In addition, an action attribute (ACTION="url" . . . URL="http://xxx.com/cgi/prog_a") in the form tag indicates a transmission location (second URL location 207) for transmitting the recognized entry content. Further, the input elements described between the FORM tags include the attribute submit type (TYPE="submit"), which is the Send button in the web page image. When the user clicks on the send button, input data entered in the entry spaces is transmitted to the second URL location 207 (URL="http://xxx.com/cgi/prog_a" in FIG. 3) assigned to the action attribute (ACTION="YYYY", wherein "YYYY" is a URL or an email address), together with a character array assigned to the NAME variable (NAME="Name", "Sex", or "Address" in FIG. 3) in the input element of the entry space. Hence, a web page including FORM tags can identify the transmission location (second URL location 207) for input data according to the character array assigned to the action attribute in the FORM tags. Here, the input data inputted into the entry space is a character array entered in the entry space if the entry space is a text type, and a character array indicating a value assigned to the value attribute (VALUE="Male" or "Female") of the checked entry space if the entry space is a check type.

In S240, the CPU 12 uses the output data that were produced in S205, and recognizes the entry content in entry spaces 94 based on the positions of the entry spaces 94 identified in S230. Since the entry content in the entry spaces 94A and 94D for text input (the entry space 94A for name and the entry space 94D for address in FIG. 5) are characters entered by the user, the CPU 12 performs an OCR process to recognize characters in the image positioned in the entry spaces 94A and 94D. Since entry content for check entry spaces 94B and 94C (entry spaces for male and female in FIG. 5) are selections, the CPU 12 recognizes entry content by determining whether an image representing a check exists at the entry space 94B or 94C.

Here, it will be explained more specifically how the positions of the entry spaces are identified and how the entry content is recognized in S230 and S240. In S230, the CPU 12 reads command lines in the web page data in FIG. 3 line by line. The CPU 12 interprets the command lines and learns that a character array "Registration" should appear on the first line of the web page image, then a character array "Please, register your data to join us." should appear on the second line. The CPU 12 continues interpreting the command lines and learns that a character array "Name:" should appear on the third line, and learns that hand-written characters on the right side of "Name:" corresponds to a variable "Name" (<INPUT TYPE="text" NAME="Name" SIZE="20"> in FIG. 3). In S240, the CPU 12 recognizes the printed characters in the web page image such as "Registration", "Please, register your data to join us.", and "Name:". Subsequently, the CPU 12 recognizes the hand-written characters on the right side of "Name:". The CPU 12 stores the recognized hand-written characters into the variable "Name". In this way, the CPU 12 compares information obtained from the command lines of the web page data (FIG. 3) with information obtained from the scanned web page image (FIG. 5), thereby identifying the positions of the entry spaces 94. Then, the CPU 12 recognizes the entry content based on the positions of the entry spaces 94.

In S250, the CPU 12 stores, in the RAM 16, the entry content recognized in S240 and data required for transmitting the entry content to the second URL location 207 at the server 205. Specifically, the CPU 12 stores the entry content recognized in S240 (character arrays inputted in the text-type entry spaces 94A and 94D and a character array assigned to the value attribute in the input element of the check-type entry space 94B or 94C), the variable names for the entry spaces 94A to 94D, and information for the transmission location (second URL location 207) in the server 205, that is, the command for the CGI program and the address of the transmission location.

In S260, the CPU 12 displays a message "Perform verification print? YES→Start button NO→Cancel button" on the display panel 44, prompting the user to perform an operation selecting whether to perform a verification print to confirm the entry content recognized in S240.

In S270, the CPU 12 determines whether either the Start button or the Cancel button has been pressed as a selection operation in response to the message displayed in S260. If the CPU 12 determines that the Start button has been pressed (S270: YES), indicating a selection to perform a verification print, then the CPU 12 advances to S280.

Figure 7:
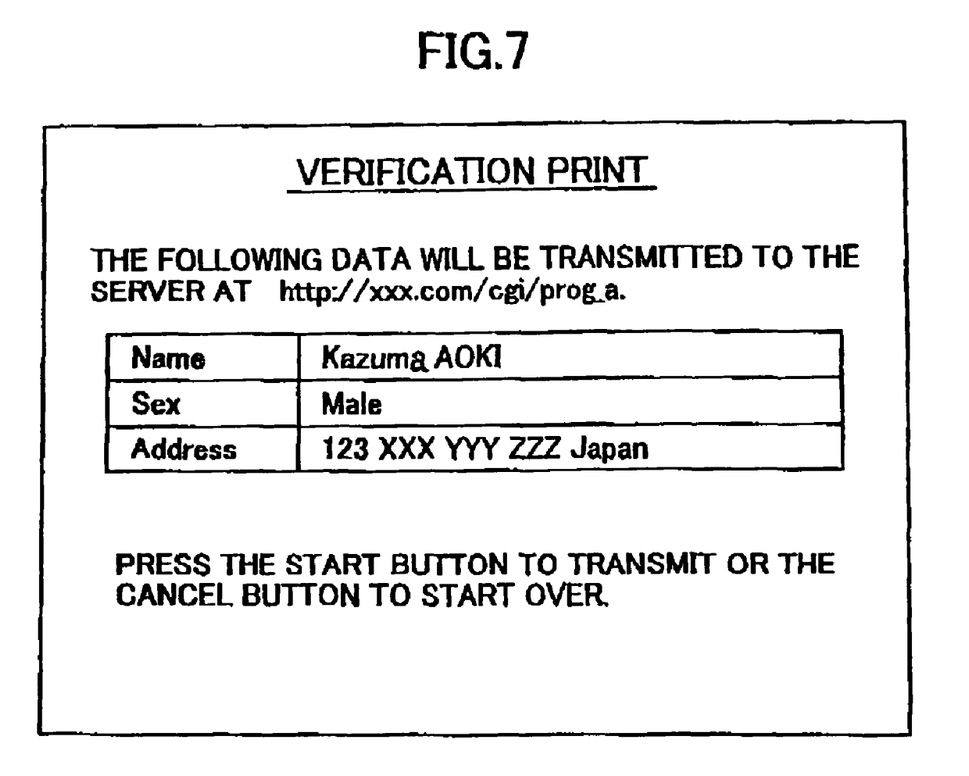
FIG. 7 is an explanatory diagram showing an image printed for verification.

In S280, the CPU 12 generates print data for printing on paper a composite image corresponding to the entry content recognized in S240 together with the variable names for the entry content. Specifically, the CPU 12 generates print data such as that shown in FIG. 7, including a table matching the variable names for each entry space (Name, Sex, Address) and entry content (Kazuma AOKI, Male, 123 XXX YYY ZZZ Japan), and a message prompting the user to make a selection.

In S290, the CPU 12 controls the printing unit 36 to print on paper the image based on the print data generated in S280.

On the other hand, if the CPU 12 determines in S270 that the Cancel button was pressed (S270; NO), indicating that the user has selected not to perform a verification print, then steps S280 and S290 are skipped and the CPU 12 advances to S300.

In S300, the CPU 12 displays a message such as "Transmit entry content? YES→Start button/NO→Cancel button" on the display panel 44, prompting the user to perform an operation to select whether to transmit the entry content to the transmission location (second URL location 207) in the server 205. In S310, the CPU 12 determines whether either the Start button or the Cancel button was pressed as a selection operation in response to the message displayed in S300.

In S310, if the CPU 12 determines that the Start button was pressed (S310: YES), indicating that the user selected to transmit the entry content, then the CPU 12 advances to S320.

In S320, the CPU 12 controls the communication controlling unit 60 to transmit the entry content using data stored in the RAM 16 in S250. In the example of FIG. 5, the communication controlling unit 60 connects to the server 205 (xxx.com) using http protocol and accesses "/cgi/prog_a?Name=Kazuma+AOKI&Sex=Male&Address=123+XXX+YYY+Z ZZ+Japan" using the GET command. After transmitting the entry content to the transmission location (second URL location 207) at the server 205, normally response data (such as web page data for a web page indicating that data has been received) is returned. Here, the web page based on this response data may be printed on paper. After S320, the entry-content transmitting process ends.

In S310, on the other hand, if the CPU 12 determines that the Cancel button was pressed (S310: NO), indicating the user selected not to transmit the entry content, then in S330 the CPU 12 displays a message "Canceled" on the display panel 44, and the entry-content transmitting process ends.

In this way, when the user inputs the URL (first URL) of a web page, the multifunction device 1 according to the present embodiment prints the web page on paper, enabling the user to print out and browse desired web pages on paper. When the web page printed on paper is a data-input web page, the user can fill in required entry spaces on the web page by hand and have the multifunction device 1 scan the handwritten or manual-entry data, thereby achieving the same process as a process executed by a web browser on a personal computer.

Further, since the multifunction device 1 can perform a verification print to enable the user to confirm the results of recognized entry content, the user can avoid transmitting entry content that has been incorrectly recognized. The user can easily confirm the results of recognized entry content because the results are printed in a table having a new format, that is, a format different from that of the image of the data-input web page. This new format is advantageous in that it does not include unnecessary information and it is easier to read.

Further, since a message prompting the user to perform an input operation is printed along with the recognition results, the user can easily understand that an input operation is required. Further, since the multifunction device 1 allows the user to select whether or not to perform a verification print depending on circumstances, the multifunction device 1 can reduce the amount of wasteful printing.

In particular, the multifunction device 1 stores data required for transmitting entry content in the RAM 16 and prints results of the recognized entry content on paper. Accordingly, the user can direct the multifunction device 1 to transmit the entry content by simply pressing the Start button after confirming the entry content is correct. Hence, the user need not rescan the paper including the entry content on the multifunction device 1.

In addition, the multifunction device 1 scans the first URL printed on paper, acquires web page data (HTML data) for the first URL via the Internet, and identifies information such as the position of the entry spaces 94 and the second URL location 207 for transmitting the entry content, based on the acquired web page data. Hence, the multifunction device 1 can reliably recognize and transmit the entry content entered in the entry spaces 94 without storing information such as the positions of the entry spaces 94 in the image and the transmission location (second URL location 207).

With the multifunction device 1, it is possible to identify the positions of the entry spaces 94 based on the web page data and the scanned web page image. Accordingly, the positions of the entry spaces 94 can be identified without using coordinate information, which is information on horizontal and vertical position.

While the invention has been described in detail with reference to the specific embodiment thereof, it would be apparent to those skilled in the art that various changes and modifications may be made therein without departing from the spirit of the invention.

For example, in the above-described embodiment, when the CPU 12 determines that the Cancel button has been pressed in S270 (S270: NO) in FIG. 6, the CPU 12 prompts the user to select whether to transmit the entry content to the server 205 (S300). However, considering that the user will almost always transmit the entry content when not performing a verification print, the CPU 12 may advance to S320 instead of S300 to transmit the entry content.

In the above-described embodiment, in S260 the CPU 12 displays a message prompting the user to make a selection whether to print the recognized entry content (verification print). Then, in S270, the CPU 12 determines whether to perform the verification print based on the selection made in S260. However, this selection process (s260 and S270) may be omitted such that the verification print is always performed.

In the above-described embodiment, the first URL location 206 from which the web page data is acquired (URL http://xxx.com/regist/form.html in FIGS. 4 and 5) and the second URL location 207 to which the recognized entry content is transmitted (URL http://xxx.com/cgi/prog_a in FIG. 3) are located at the same server 205 (xxx.com). However, the first URL location 206 from which the web page data is acquired and the second URL location 207 (transmission location) to which the recognized entry content is transmitted may be located at different servers.

In the above-described embodiment, HTML data is used as the Web page data shown in FIG. 3. However, data described in a format other than HTML data may also be used.

In the above-described embodiment, the entry-space-type specifying data INPUT TYPE-"text" in the Web page data (FIG. 3) only indicates that the entry space is used for inputting texts, and does not specify shapes of the entry spaces such as a square shape or circle shape, The shapes of the entry spaces are specified by software in the multifunction device 1. Thus, although the entry spaces 94A and 94D are square-shaped or box-shaped in the embodiment, other shapes such as underline (______) may also be used. Similarly, although the entry spaces 94B and 94C are circle-shaped in the embodiment, other shapes such as boxes may also be used.

Further, the entry-space-type specifying data may be data that specifically indicate images themselves. The data that specifically indicate images themselves are shapes, colors, or the like. For example, the entry-space-type specifying data may be INPUT SHAPE="square", INPUT SHAPE="circle", and the like. In this example, the entry-space-type specifying data do not directly specify text type, radio type, or the like. However, the CPU 12 knows that the entry spaces having square shapes are used for texts and the entry spaces having circle shapes are used for options or selections. Thus, the CPU 12 performs processing in S230 and S240 (FIG. 6) based on the assumption that the square shapes are text inputs and the circle shapes are option inputs.

In the above-described embodiment, the multifunction apparatus 1 is connected to the internet network 200 as shown in FIG. 1. However, the multifunction apparatus 1 may be connected to other kinds of network, such as a local area network.

Figure 8:
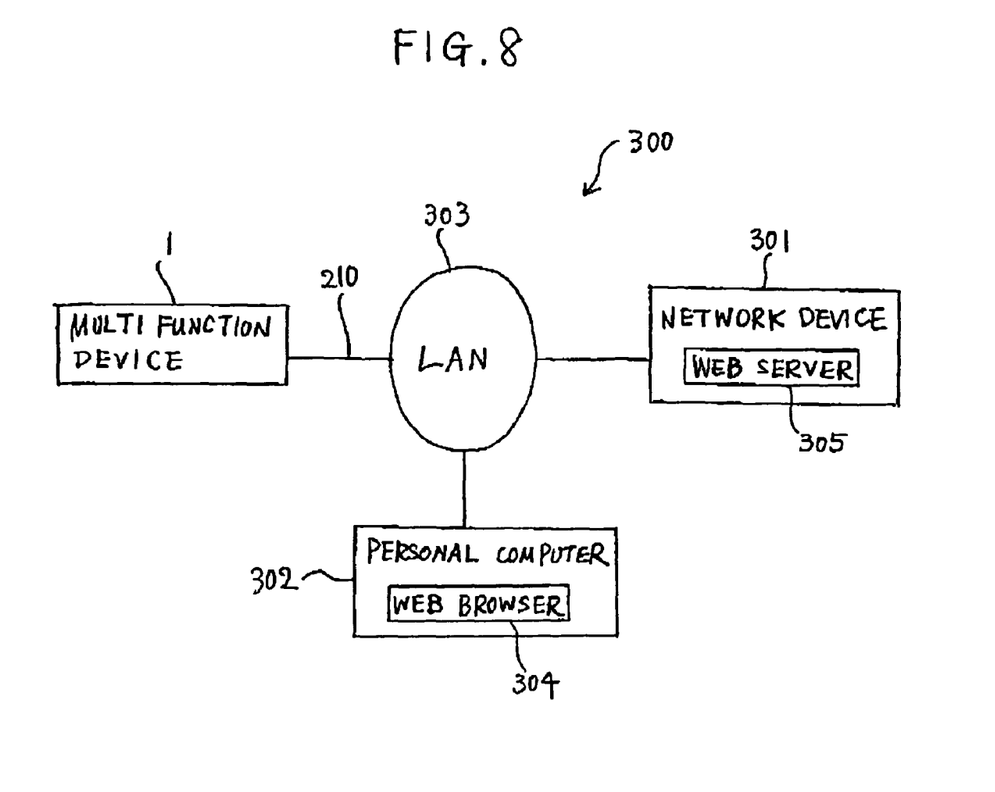
FIG. 8 is a block diagram showing a network system according to a modification.

In the above-described embodiment, data is transmitted from the multifunction device 1 to the second URL location 207 at the server 205 on the Internet network 200, but the present invention is not limited to this embodiment. As shown in FIG. 8, a network system 300 includes the multifunction device 1, a network device 301, and a personal computer 302, all of which are connected to one another via a local area network (LAN) 303. The multifunction device 1 is connected to the LAN 303 via the communication line 210. The network device 301 is, for example, another multifunction device. The network device 301 includes a web server 305. The web server 305 stores HTML data that represents images including entry spaces. The entry spaces are used for modifying setting information of the network device 301, such as speed dial entries (These images are hereinafter referred to as device setting images). The personal computer 302 has a web browser 304. In the network system 300, the user can use the web browser 304 in the personal computer 302 to view the device setting images and to change the setting information for the network device 301 by inputting required data in the entry spaces of the device setting images and by transmitting the data to the network device 301. In this modification, the multifunction device 1 can be used to modify the setting information of the network device 301, according to similar processes in the embodiment described above. That is, the device setting image is printed according to the web printing process (FIG. 2). Then, the user enters required data on the printed device setting image by hand. Subsequently, the entry-content transmitting process (FIG. 6) is executed, and the required data is transmitted to the web server 305 in the network device 301. In this way, the setting information of the network device 301 is changed by the multifunction device 1.

Figure 9:
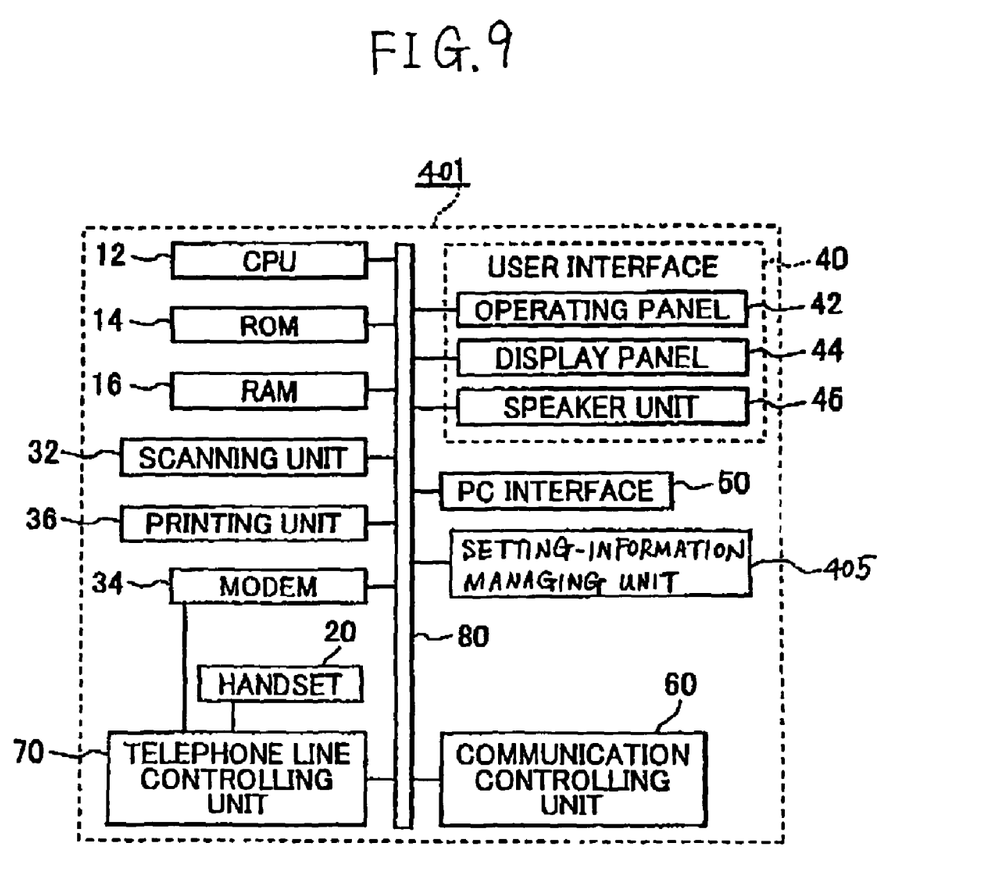
FIG. 9 is a block diagram showing a multifunction device according to another modification.

In another modification shown in FIG. 9, a multifunction device 401 is configured to change setting information of the multifunction device 401 itself. The multifunction device 401 has basically the same construction as the multifunction device 1, but further includes a setting-information managing unit 405. The multifunction device 401 is not connected to either a network or a server. The setting-information managing unit 405 stores both the setting information of the multifunction device 401 and HTML data. The HTML data correspond to images including entry spaces for changing the setting information.

Figure 6:
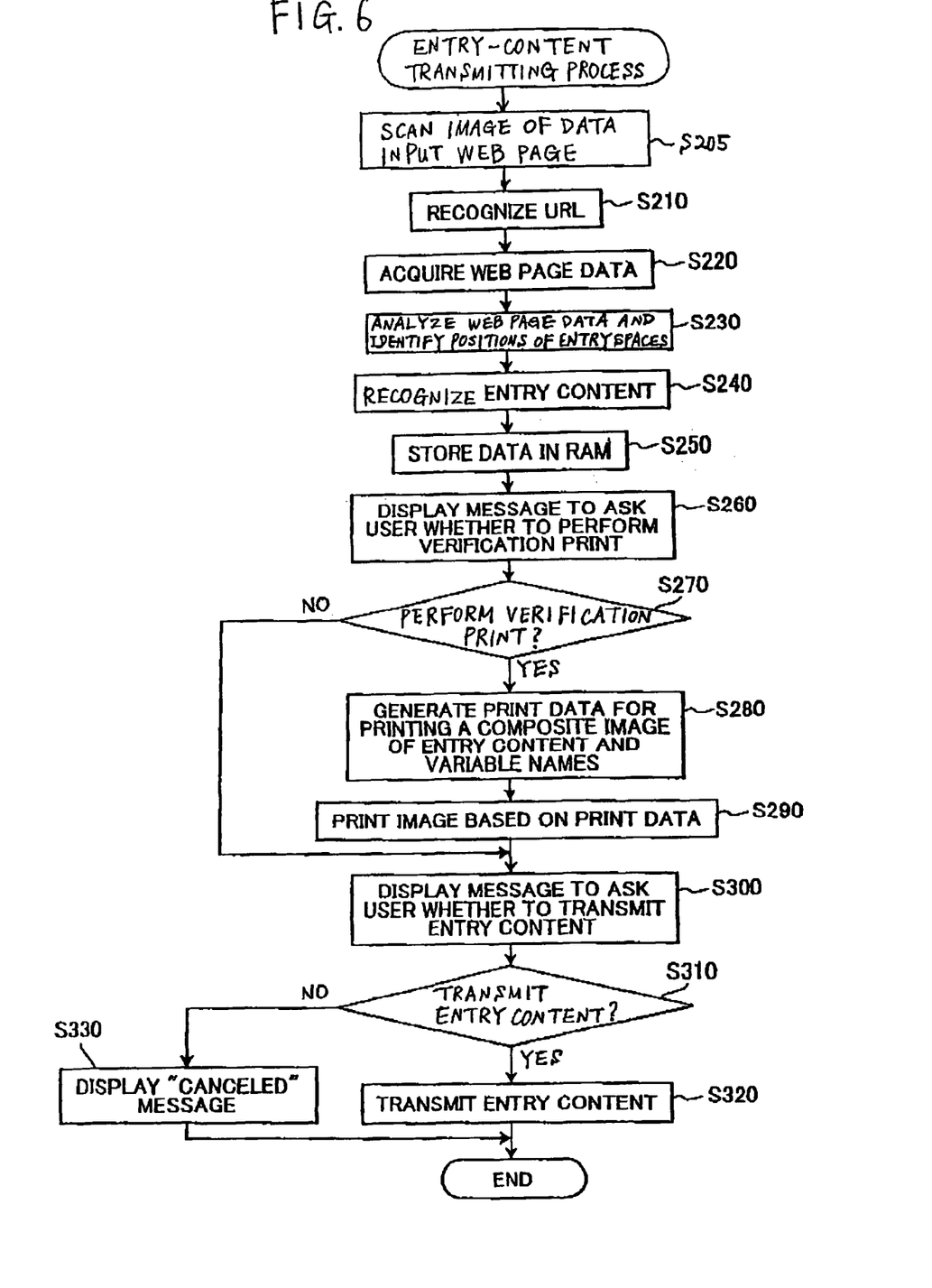
FIG. 6 is a flowchart showing steps in an entry-content transmitting process.

In this modification, the setting information is changed according to similar processes to the web printing process (FIG. 2) and the entry-content transmitting process (FIG. 6). In the web printing process (FIG. 2), the CPU 12 of the multifunction device 401 acquires the HTML data from the setting-information managing unit 405. Then, the printing unit 36 prints the images on paper. In the entry-content transmitting process (FIG. 6), the CPU 12 changes the setting information based on the entry content that has been entered by hand in the entry spaces, instead of transmitting the entry content to the server 205 (FIG. 1). In this way, the user can change the setting information of the multifunction device 401 by entering required data on the paper by hand. According to this modification, the present invention can be applied to the multifunction device 401 that is not connected to a network. However, the multifunction device 401 may be connected to a network such as a LAN.

What is claimed is:
1. A data processing apparatus comprising:
a communication unit that communicates with a network;
a storing unit that stores data;
a printing unit that performs printing;
a scanning unit that scans an image on a recording medium, the image including Uniform Resource Locator (URL)

information that indicates a URL, printed content that has a first entry space at a first position on the recording medium, and manual-entry content that is written manually in the first entry space, the scanning unit producing output data indicative of the URL information, the printed content and the manual-entry content; and a controller that:
  extracts the URL information from the output data and recognizes the URL;
  controls the communication unit to access the recognized URL and obtain a web page therefrom;
  recognizes a second position of a second entry space of the web page obtained from the recognized URL by analyzing the obtained web page without printing;
  identifies the first entry space on the recording medium according to the recognized second position of the second entry space;
  recognizes, from the output data, the manual-entry content written in the identified first entry space of the scanned recording medium.

2. The data processing apparatus as claimed in claim 1, wherein
  the communication unit is connected to a first location and a second location on the network, the controller controls communications with the first location and the second location, the web page is located at the first location, the first location is indicated by the URL information, and the web page includes second locating information that indicates the second location,
  the controller identifies the second location by reading the second locating information in the web page, and
  the controller performs a transmitting process to transmit the manual-entry content stored in the storing unit to the second location.

3. The data processing apparatus as claimed in claim 2, wherein the printing unit prints, on the another recording medium, a message prompting a user to perform an input operation to indicate whether to transmit the manual-entry content to the second location.

4. The data processing apparatus as claimed in claim 1, wherein the printing unit prints the printed content on the recording medium, thereby enabling a user to manually enter the manual-entry content in the first entry space of the printed content.

5. The data processing apparatus as claimed in claim 1, wherein the printing unit prints the manual-entry content, stored in the storing unit, in a predetermined format different from the image scanned by the scanning unit.

6. The data processing apparatus as claimed in claim 1, wherein the controller enables a user to make a selection whether to print the manual-entry content, the controller producing a first signal instructing to print the manual-entry content when the user has performed a first input operation instructing to print the manual-entry content, and producing a second signal instructing not to print the manual-entry content when the user has performed a second input operation instructing not to print the manual-entry content.

7. The data processing apparatus as claimed in claim 1, wherein the web page is described in a format of HTML data.

8. The data processing apparatus as claimed in claim 1, wherein the controller prompts a user to confirm the manual-entry content printed on the another recording medium, and
  the controller performs a predetermined process using the manual-entry content stored in the storing unit when the manual-entry content printed on the another recording medium is confirmed.

9. The data processing apparatus as claimed in claim 1, wherein the predetermined process is to transmit the manual-entry content stored in the storing unit to a second location included in the web page.

10. The data processing apparatus as claimed in claim 9, wherein the controller identifies the second location from the web page.

11. The data processing apparatus as claimed in claim 1, wherein the controller controls the printing unit to print a message that prompts a user to confirm the recognized manual-entry content.

12. The data processing apparatus as claimed in claim 1, wherein the controller prompts a user to select whether to perform the printing; and
  the controller prohibits the printing and performs a predetermined process using the manual-entry content stored in the storing unit, when the printing is not selected.

13. The data processing apparatus as claimed in claim 1, wherein the URL information includes a character array indicating the URL, and
  the controller performs an optical character recognition process to recognize the URL from the scanned image.

14. The data processing apparatus as claimed in claim 1, wherein the manual entry-content comprises a character.

15. The data processing apparatus as claimed in claim 1, wherein the controller recognizes the second position of the second entry space by analyzing HTML within the obtained web page.

16. The data processing apparatus as claimed in claim 1, wherein the second entry space corresponds to the first entry space without any of the manual-entry content.

17. The data processing apparatus as claimed in claim 1, wherein the controller controls to store the recognized manual-entry content in the storing unit.

18. The data processing apparatus as claimed in claim 1, wherein the controller controls the printing unit to print the manual-entry content stored in the storing unit on another recording medium.

* * * * *